US009022775B2

(12) United States Patent
Hipp et al.

(10) Patent No.: US 9,022,775 B2
(45) Date of Patent: May 5, 2015

(54) DEVICE AND METHOD FOR PRODUCING A MOULDED BODY HAVING MICROSTRUCTURES

(75) Inventors: Thomas Hipp, Tuttlingen (DE); Frank Gehring, Obernheim (DE)

(73) Assignee: Andreas Hettich GmbH & Co. KG, Tuttlingen (DE)

(*) Notice: Subject to any disclaimer, the term of this patent is extended or adjusted under 35 U.S.C. 154(b) by 814 days.

(21) Appl. No.: 12/641,306

(22) Filed: Dec. 17, 2009

(65) Prior Publication Data

US 2010/0156004 A1 Jun. 24, 2010

(30) Foreign Application Priority Data

Dec. 19, 2008 (DE) .......................... 10 2008 054 993

(51) Int. Cl.
*B29C 39/08* (2006.01)
*B29C 33/42* (2006.01)
*B29C 41/04* (2006.01)
(Continued)

(52) U.S. Cl.
CPC ................ *B29C 39/08* (2013.01); *B29C 41/04* (2013.01); *B29C 33/424* (2013.01); *B29C 35/02* (2013.01); *B29C 37/006* (2013.01); *B29C 39/006* (2013.01); *B29C 39/26* (2013.01); *B29C 35/0888* (2013.01); *B29C 37/0053* (2013.01);
(Continued)

(58) Field of Classification Search
CPC ....................................................... B29C 39/08
USPC ................................... 264/311; 425/425, 434
See application file for complete search history.

(56) References Cited

U.S. PATENT DOCUMENTS 4,034,955 A * 7/1977 Wallace ..................... 249/137
4,350,481 A   9/1982 Corea et al.
(Continued)

FOREIGN PATENT DOCUMENTS

DE      2537262 A1    2/1977
DE      3444996 A1    12/1986
(Continued)

OTHER PUBLICATIONS

Japanese Patent Office, Office Action, Notification of Reason for Refusal, Feb. 4, 2014, Japanese Application No. 2009-284116, pp. 1-7.
(Continued)

*Primary Examiner* — Ryan Ochylski
(74) *Attorney, Agent, or Firm* — Woodling, Krost and Rust

(57) ABSTRACT

The invention relates to a method and a device for producing a moulded body having microstructures from moulding material. The method for producing a moulded body having microstructures on a carrier out of moulding material is effected by inputting a moulding material into a container (10) comprising a mould cavity (14), wherein at least one micro-structured mould (12) is provided in the mould cavity. Furthermore, the centrifugation of a container (10) is carried out until the moulding material has completely entered into the structure of the mould (12). Thereafter, the curing of the moulding material is carried out to form a moulded body having microstructures, which is then removed from the mould (12) and the container (10). A container (10) is provided into which the mould (12) has been inserted, and the container (10) is connectable to a centrifuge wherein the container (10) comprises a mould cavity for receiving the moulding material wherein the mould cavity (14) comprises at least one micro-structured mould (12).

8 Claims, 5 Drawing Sheets

(51) Int. Cl.
*B29C 35/02* (2006.01)
*B29C 37/00* (2006.01)
*B29C 39/00* (2006.01)
*B29C 39/26* (2006.01)
*B29C 35/08* (2006.01)
*B29C 39/28* (2006.01)
*B29L 31/00* (2006.01)

(52) U.S. Cl.
CPC ........ *B29C 39/28* (2013.01); *B29C 2035/0827* (2013.01); *B29L 2031/756* (2013.01)

(56) References Cited

U.S. PATENT DOCUMENTS

| | | | |
|---|---|---|---|
| 4,481,049 A | 11/1984 | Reichmanis et al. | |
| 4,810,183 A * | 3/1989 | Place et al. | 204/620 |
| 2009/0182306 A1 * | 7/2009 | Lee et al. | 604/506 |

FOREIGN PATENT DOCUMENTS

| | | |
|---|---|---|
| EP | 0185296 A1 | 6/1986 |
| EP | 0393348 | 10/1990 |
| EP | 0466025 | 1/1992 |
| EP | 1512993 A1 | 9/2005 |
| JP | 1977019764 | 2/1977 |
| JP | 1980135618 | 10/1980 |
| WO | 9411788 | 5/1994 |
| WO | 2007095241 A2 | 8/2007 |

OTHER PUBLICATIONS

European Patent Office, Examination Report, November 4, 2014, p. 1-5, Application No. 09178911.5, Applicant: Andreas Hettich Gmbh & Co. Kg, Munich, Germany.

* cited by examiner

DEVICE AND METHOD FOR PRODUCING A MOULDED BODY HAVING MICROSTRUCTURES

Priority is claimed to German Patent Application No. DE 10 2008 054 993.2 filed Dec. 19, 2008 which is incorporated herein in its entirety by reference hereto.

The invention relates to a method for producing a moulded body having microstructures, as well as a device for producing a moulded body having microstructures.

BACKGROUND OF THE INVENTION

Microstructures are to be found in various applications. One application area is micro-fluidics which are used in particular for chip-laboratories and so called bio-discs. For producing micro-channels, one uses, for example, a micro-structured substrate which comprises cavities on its surface. In order to finally close the cavities or channels, the surface of the substrate is covered by attaching another substrate thereto which not necessarily has to be structured.

For producing microstructures, various methods are known. One possibility of the production is provided by moulding techniques where moulding material is structured by means of a mould which comprises a negative shape of the desired structure. A liquid material is supplied into or onto a mould, hardened and, thereafter, removed again. Difficulties are encountered in producing structures of high surface quality since gas inclusions are very disturbing in view of the size of the microstructures. Gas inclusions originate mainly in the cavities of the structures as well as in the moulding material itself.

The negative shape related to the desired structure is, for example, produced by a further method of micro-technical structuring, wherein a wafer is coated with photo resist, the photo resist is exposed, developed and, finally, the wafer is structured by etching. A particularly suitable substrate for this method is silicon. With a negative mould produced in this way, further micro structures can be moulded.

It is known to apply a moulding mass unto a micro structured mould by means of a spatula. The material is hardened and, thereafter, removed from the mould. This method has the deficiency that the applied pressure is comparatively small, and that gas inclusions can be forced out only with difficulties. This method is not very complex and it can be also be considered for comparatively small number of pieces. In order to further handle the problem of the gas inclusions, a subsequent degassing in vacuum is provided. In spite of this method step, the surface quality as well as the shaping of the structures is prone to be improvement. Furthermore, the injection moulding method is known in which the moulding material is essentially fed through a screw into a cavity which comprises a micro-structured surface. Because of the pressure of the screw, the melted mass having a low viscosity is pressed into the cavities. In this method, air inclusions in the microscopic arrange are regularly encountered. This has a detrimental effect on the structures to be formed. Therefore, a complex degassing is necessary. In spite of this, the quality of the surface is anyway impaired by the gas inclusions.

A further method for producing micro structures is the so called hot stamping. In hot stamping, a polymer blank is inserted into a stamp mould. The mould is heated, and, upon reaching an appropriate temperature, the micro structure is stamped in by means of a stamp. In case of a high aspect ratio, it is indispensable also with this method to carry out the method in vacuum. The air inclusions in the moulding material are left back also in this method.

Furthermore, it is basically known from DE 34 44 996 A1, to degas a polymer by means of centrifugation. In this document, the production of a plastic part in a moulding tray is disclosed which consists out of a centrifuge tray. The mould is inserted in the tray bottom. The polymer plastics material is fed into the tray where after it is centrifuged.

This procedure has the deficiency that the emerging layer is not homogenous since the centrifugal force is only applied in the middle of the container bottom exclusively perpendicular to the bottom of the tray. Therefore, the material is shifted to the edge area which results not in a homogenous layer thickness across the all surface of the mould. Therefore, this method is not suitable since, on the one hand, moulded bodies free of bubbles can be produced and, on the hand, the tolerances are too large for producing micro structures.

Furthermore, it is known from this document, to position a plate onto the polymer in order to enlarge the forces on the polymer. This has the deficiency that the plate is arranged opposite to the direction of expulsion, and in that the gas inclusions expelled from the material are hindered in finally exiting from the polymer in the end.

Furthermore, a method is known from EP 1 512 993 A1 which describes the production of micro structures. According to this method, a polymer is applied to a rotating disc and covered floating covered with a wafer provided with a microstructure. This method ensures the production of a homogenous layer thickness. Since the centrifugal force acts in the direction to the edge areas, in order to distribute the polymer, gases are not transported to the outside according to the principle of the material separation. This method has the disadvantage that bubble free mould bodies cannot be produced.

SUMMARY OF THE INVENTION

In view of the above, a method and a device is needed allowing the production of micro structured surfaces of highest quality, i.e. with a minimum of gas inclusions, with a comparatively low technical effort, while avoiding the above mentioned deficiencies.

According to an aspect of the invention, a method for producing a moulded body having microstructures from moulding material, comprises inputting a moulding material into a container, comprising a moulding cavity, wherein at least one micro-structured mould is provided in the mould cavity; centrifuging the container until the moulding material has completely entered into the structure of the mould; curing the moulding material to a moulded body having microstructures; and removing the moulded body from the mould and the container.

The invention is based on the finding that, by means of a centrifuge, high forces can be applied which allow, at the one hand, the pressurisation and, on the other hand, the degassing of the material.

The inventive method comprises the steps stated in the following. The method comprises the filling of the moulding material into a container which comprises a micro structured mould. Furthermore, centrifugation of the container is effected. The moulding material is, starting from the bottom of the container, compacted bit by bit in direction to the opening of the container. The given mould is filled with moulding material of relatively high density in this way. The contours of the moulded body are given by the shape of the container which ensures a constant thickness also in the range of micrometers. Since the moulding material is pressed into the mould cavity with a sufficiently high force, the definite action of the force can be neglected. Furthermore, the moulding material is hardened to obtain the moulded body. Furthermore, the inventive method includes the removal of the produced moulded body with the microstructure from the mould and the container.

This method has the advantage that the moulding material is pressed with high pressure into the micro structures of the mould by means of centrifugation. Furthermore, the moulding material is pressed right into the edges of the cavities by means of the high pressure, since the gas which is disposed in the cavities is squeezed out because of the density-dependence of the material separation. This provides an optimally moulded microstructure having a high surface quality.

A degassing of the moulding material is, therefore, effected during the centrifugation. The gas is pressed out in the sense of the density-dependent material separation. The gas is not only squeezed out of the cavities of the structures, but, furthermore, from the material itself. It is, at first, displaced to the container wall near to the centrifuge and, subsequently, along this container wall out of the total moulding region. It is essential that the moulding material is fed into a container, i.e. a moulding cavity, since the exact moulding of a constant layer thickness is insured only in this way.

This method provides a clearly faster production of the desired microstructures since the up to now common production of vacuum and the degassing related thereto, was very much time consuming. Furthermore, the technical effort is remarkably smaller in the inventive method, since vacuum devices can be dispensed with.

According to a further aspect of the invention, the moulding material is fed into the container during centrifugation. This improves the degassing of the material itself as well as the degassing of the cavities of the microstructures. During the centrifugation, the gas completely escapes from the container and this is completely filled with moulding material.

It is also an advantage to supply heat to the moulding material for curing. This shortens the curing time as a rule. Depending on the material characteristics of the moulding material, the supply of heat has a special meaning. If the material cures only at a predetermined temperature reference value, it is supplied in a state of low viscosity and processed independent of time, and then, at a desired point of time, it is cured by heating the container. The container is heated during the centrifugation up to a little under the reference temperature. Then, only a small temperature step which can be carried out fast, is necessary in order to start the curing.

Additionally or alternatively to this, the material can also be cured by applying radiation, in particular UV-radiation. Therein, the radiation is introduced through the radiation permeable container wall into the moulding material. This procedure has the advantage that the moulding material is cured at a desired point of time.

Furthermore, it is advantageous that the curing takes place during the centrifugation. Thereby, the moulding material cures under compression which avoids the re-inclusion of gases and ensures a compact structure. Therefore, this contributes to a high quality of the generated microstructures on the moulded body out of moulding material.

In the moulding cavity, in particular the moulded body is produced which comprises a first and a second surface on its outer surface. The two surfaces are spaced from each other. The first surface is structured in that the moulding material is pressed into the mould by means of the centrifugal force. A stamp element is pressed onto the second surface by the centrifugal force. The surface of the stamp element thereby forms a part of the surface of the side surface of the mould cavity. Pressing the stamp onto the moulding material enables a shaping of the second surface. Furthermore, additional pressure is exerted onto the moulding material because of the mass of the stamp element.

According to a further advantage aspect, a micro-structuring of the second surface is affected by the stamp element since the stamp element comprises a structured surface which is pressed into the moulded body. Thereby, a multiple surface micro-structuring of a moulded body is achieved in one process step.

The cured moulded body comprising the micro structures can also be transferred to a finishing procedure or a further processing, respectively, after it has been removed from the mould or the container, respectively. Thereby, the moulded body can be adapted depending on requirements.

According to an aspect of the invention, a device for producing a moulded body having microstructures by means of a moulding material, wherein a micro-structured surface serves as a mould for the moulding material, comprises a container the mould is inserted, where the container is adapted to connected to a centrifuge in which the container is rotatable about a rotational axis, wherein the container comprises a mould cavity for receiving the moulding material, wherein the mould cavity comprises at least a micro-structured mould.

The device for producing moulded bodies having microstructures comprises a mould which comprises a micro-structured surface, serves for structuring the moulding material. According to the invention, there is provided a container having a mould cavity, wherein the container is adapted to be connected to a centrifuge. At least one micro-structured mould is provided in the mould cavity.

According to a further aspect of the invention, the container comprises an upper part and a lower part. This facilitates the manufacturing method since both parts can be manufactured separately and put together subsequently. The two parts are formed such that they form a cavity when assembled. Furthermore, a seal is provided between the two parts which seal avoids an undesired leaking of moulding material.

According to a further aspect of the invention, the container comprising an upper part and a lower part, is fixed to the centrifuge such that the lower part is spaced further away from the centre of the centrifuge than the upper part.

In particular, it is advantageous that the mould is arranged during operation such that the distance of the micro-structured mould to the rotational axes in vertical direction increasingly is reduced from bottom to top.

This has the advantage that the moulding material is filled or compressed, respectively, in the mould cavity from the lower and, consequently, from an edge furthest way from the rotational axes to the top. Thereby the cavities in the mould are completely filled and included gases are squeezed out from bottom to top. In this embodiment, the micro-structured mould is orientated such that the air exhaust opening is orientated essentially opposite to the direction of the applied force. This allows a particularly efficient degassing of the polymer. This is of great importance in particular in the production of microstructures.

It is particularly advantageous when the mould is arranged in parallel to the upper part and the lower part.

Preferably, the lower part is provided with a mould receiving means for a micro-structured mould which receiving means is formed as a recess. The mould comprises a micro-structured surface. The mould forms, in this way, a part of the side surface of the mould cavity. Upon rotation of the centrifuge, the mould is pressed onto the lower part, therein, by the centrifugal force and locked thereby. Therefore, an additional mechanical locking of the mould is not necessary. The receiving means has the advantage that different moulds can be inserted into the container whereby a high degree of flexibility is ensured.

An influence on the volume of the moulded body to be produced can be taken through the thickness of the mould and the depth of the recess. With respect to the volume of the moulded body, namely also the shape of the upper part of the container plays a role. In case of a plain upper part, the volume can be controlled by the parameters thickness of the mould and deepness of the recess only with a given size of the mould.

In particular, the lower part itself is provided with a microstructured surface. This is formed in a part of the lower part which is the side surface of the mould cavity. This has the advantage that the cured moulding material can be separated easily.

The upper part can also be formed as a stamp element and it can also comprise a receiving means for the stamp element. The stamp element is, therein, supported such that it is movable by the centrifugal force in the direction to the lower part. This allows the formation of the input moulding material. Furthermore, the additional movable mass of the stamp amplifies the pressure applied to the moulding material.

The stamp element can, furthermore, comprise a microstructure on its contact surface to the moulding material. By means of the pressure which the stamp element applies to the moulding material, the imprinting of the microstructure into the moulded body is carried out. It is an advantageous that a multi-surface structuring of a moulded body is possible in one processing step by means of the combination of pressing the moulding material into the first mould at the lower part and of the stamping of a microstructure by means of the stamping element.

Preferably, the receiving means for the stamp element is provided with a releasable locking means. This locking means ensures that the stamp element does not block the mould cavity if the mould cavity is not yet completely filled with moulding material. The locking means can be released during the centrifugation at a given point of time.

In particular, the upper part comprises a material receiving means which allows filling of the mould cavity as well as discharging gas out of the mould cavity. This has the advantage that the moulding material may be brought into the mould cavity during the centrifugation. Because of the oblique orientation of the container, the opening of which is arranged in direction of the rotation axes, the moulding material is pressed by and by into the mould cavity through the centrifugal forces.

According to a further advantage of the embodiment, the volume of the mould cavity is adapted to be changed. An additional receiving means is inserted into the recess in the lower part. This is in cooperative connection with the lower part by means of a screw. By turning the screw, the receiving means is lifted and changes, in this way, the volume of the mould cavity which is generated by the recess.

The container may also be adapted to be heated. Heating of the container has the advantage that the curing process is accelerated. Thereby, when using a respective moulding material which has a certain curing temperature, it is possible to proceed with the processing without problems until the temperature is raised above the threshold value for curing.

Furthermore, a high temperature during processing is possible. This is advantageous in case the moulding material is a molten mass which is moulded in the heated condition and cured by cooling.

In a further advantage embodiment, the container is formed out of a radiation permeable material. This has the advantage that moulding material can be used which may be cured by radiation, in particular by UV-radiation. For this purpose, the device also includes a radiator, in particular a UV-radiator.

Preferably, also the mould is configured to be heated. This allows for example the moulding of thermoplastic materials COC—cyclo-olefin-copolymer or PS—polystyrene. A particular advantage is, therein, the use of the thermoplastic material COC—cyclo-olefin-copolymer which is characterized by an excellent biocompatibility and blood agreeableness.

It is particularly advantageous to form the mould as a micro-structured silicon wafer. Microstructures having a high surface quality can be produced in silicon by standard methods. Because of the standardisation of the processing, this is comparably cost effective. The quality of the mould of course has also an effect on the quality of the moulded body.

In a further advantageous embodiment of the invention, the moulding material is formed as polymer, in particular as a two component PDMS. Polymers find application in many areas such as in optics or fluidics and are adapted to be processed well. The particular advantage of PDMS is the far reaching bio-compatibility. Furthermore, PDMS is inert and processes sealing characteristics.

Furthermore, the container may be connected to the rotor of the centrifuge by means of a container support. This has the advantage that the container support may be adapted to the requirements of the application and allows a releasable connection of the container with the centrifuge. Any fitting containers can be inserted into the container support and taken of there from.

Furthermore, it is advantageous that a container is removably connected to the container support. Thereby, the container can be separated for example for exchanging the mould or for removing the produced structure from the centrifuge. This results in an enormous facilitation of the handling.

In particular, it is an advantage to fix the container support under pre-tension, such that the centrifugal forces do not influence its shape. By means of the pre-tension, a solution is achieved which has low weight and is stable anyway.

In an advantageous way, the container receiving means may essentially embrace/encompass the container at its lower side with respect to the gravity. This has the advantage that, at the one hand, it removably connects the cup with the container support and, on the other hand, one saves material and, thereby, weight at unnecessary locations.

Furthermore, the container may be arranged obliquely to the rotational axes of the centrifuge. This is advantageous as, on the one hand, the distribution of the moulding mass in the mould cavity is optimized by the inclination and, on the other hand, an optimal supporting position for the degassing may set up.

Further advantageous, features and application possibilities of the present invention can be taken from the following description in connection with the embodiment shown in the drawing.

Figure 1:
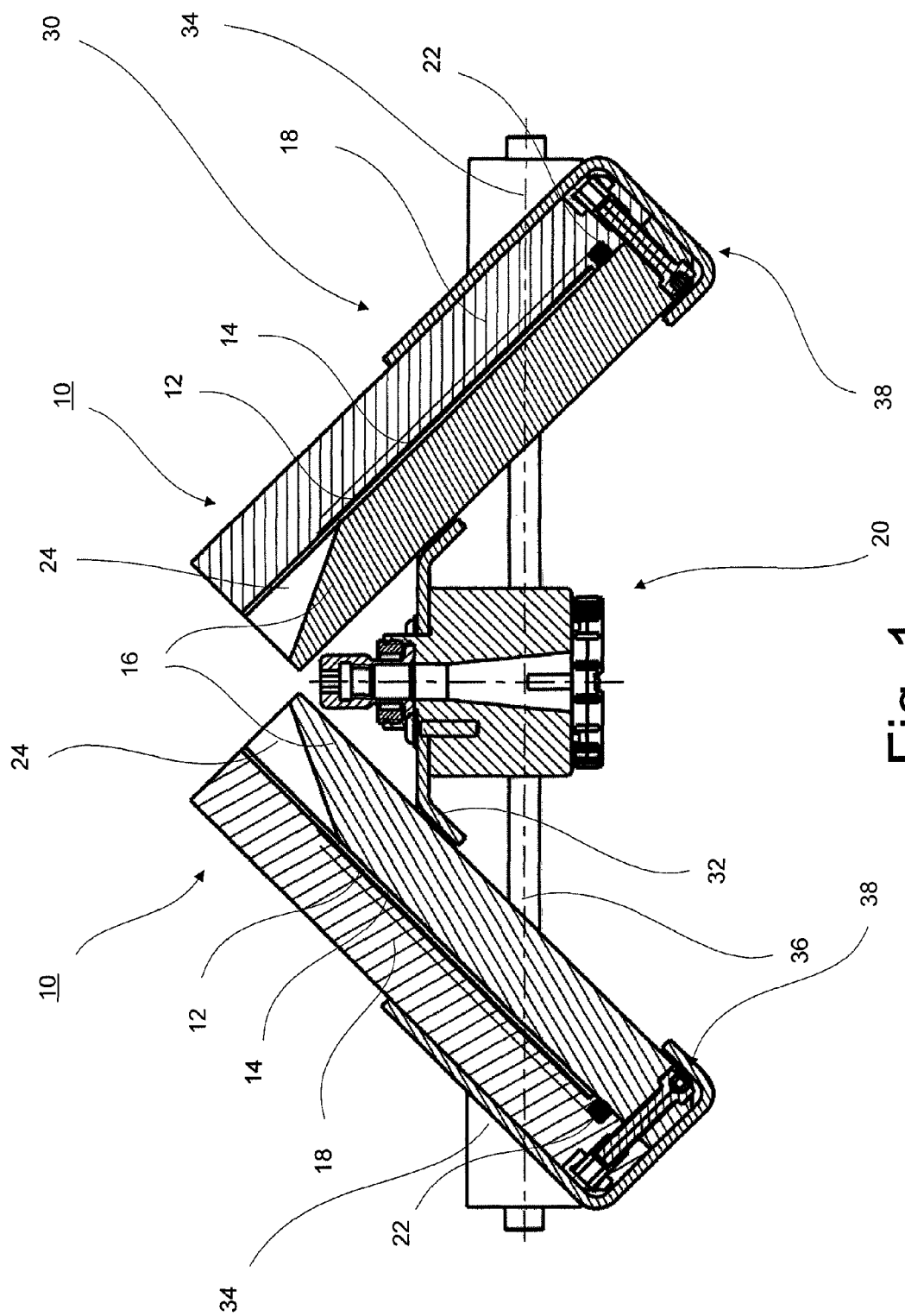
FIG. 1 shows a section view of a centrifuge with container support and containers according to the invention.

The invention is described in the following with reference to the embodiment shown in the drawing. In the specification, the patent claims, the abstract and in the drawings the terms and related reference signs are used which are used in the list of reference signs even below.

DESCRIPTION OF THE SPECIFIC EMBODIMENTS

FIG. 1 shows a section view of a centrifuge 20 to the rotor of which a container support 30 is fixed. The container support 30 comprises two U-shaped receiving pockets 38 within which a container 10 each is inserted.

Figure 2:
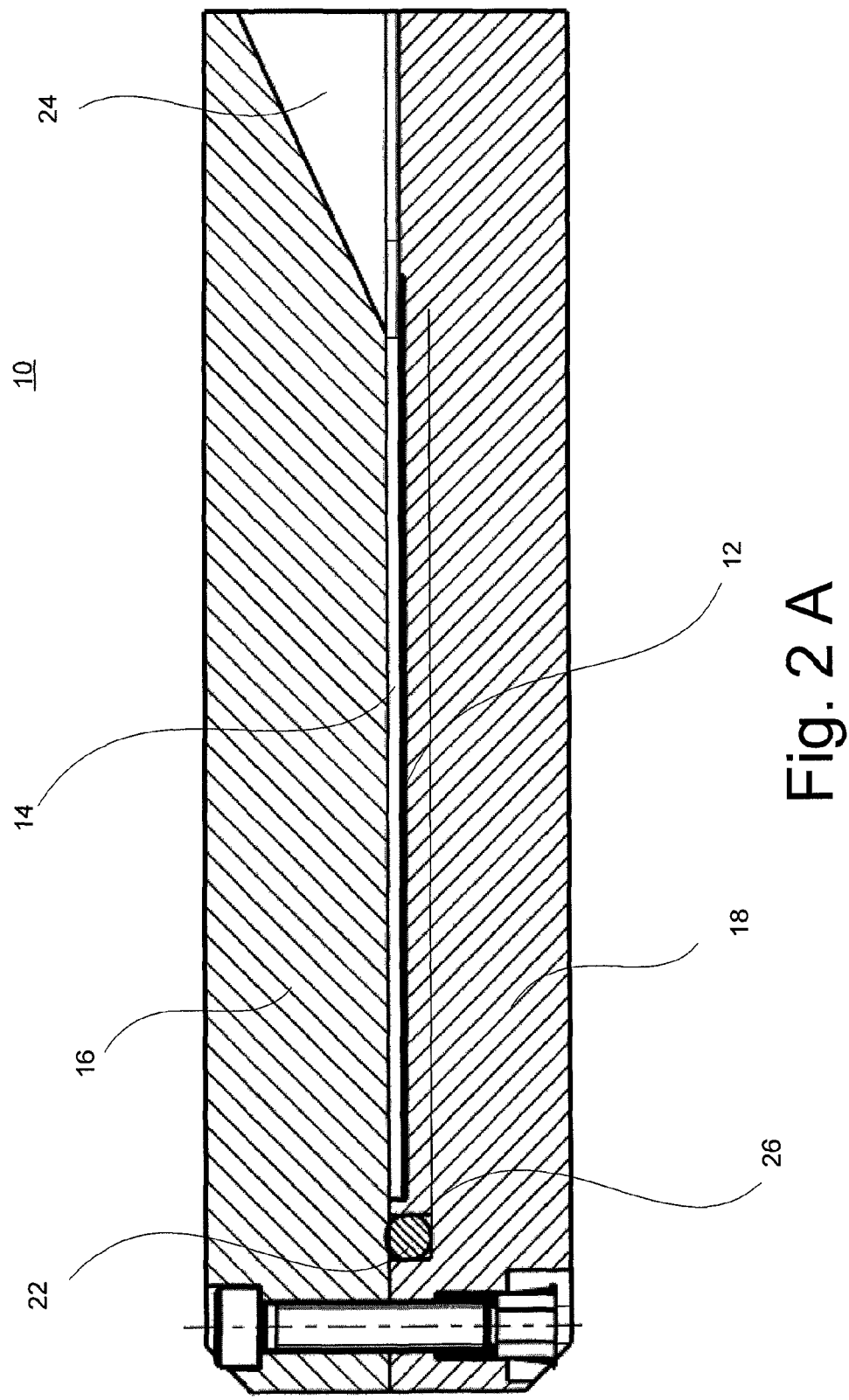
FIG. 2A shows a section view of the container of FIG. 1.
FIG. 2B shows a section view of a modified container of FIG. 2A.
Figure 2:
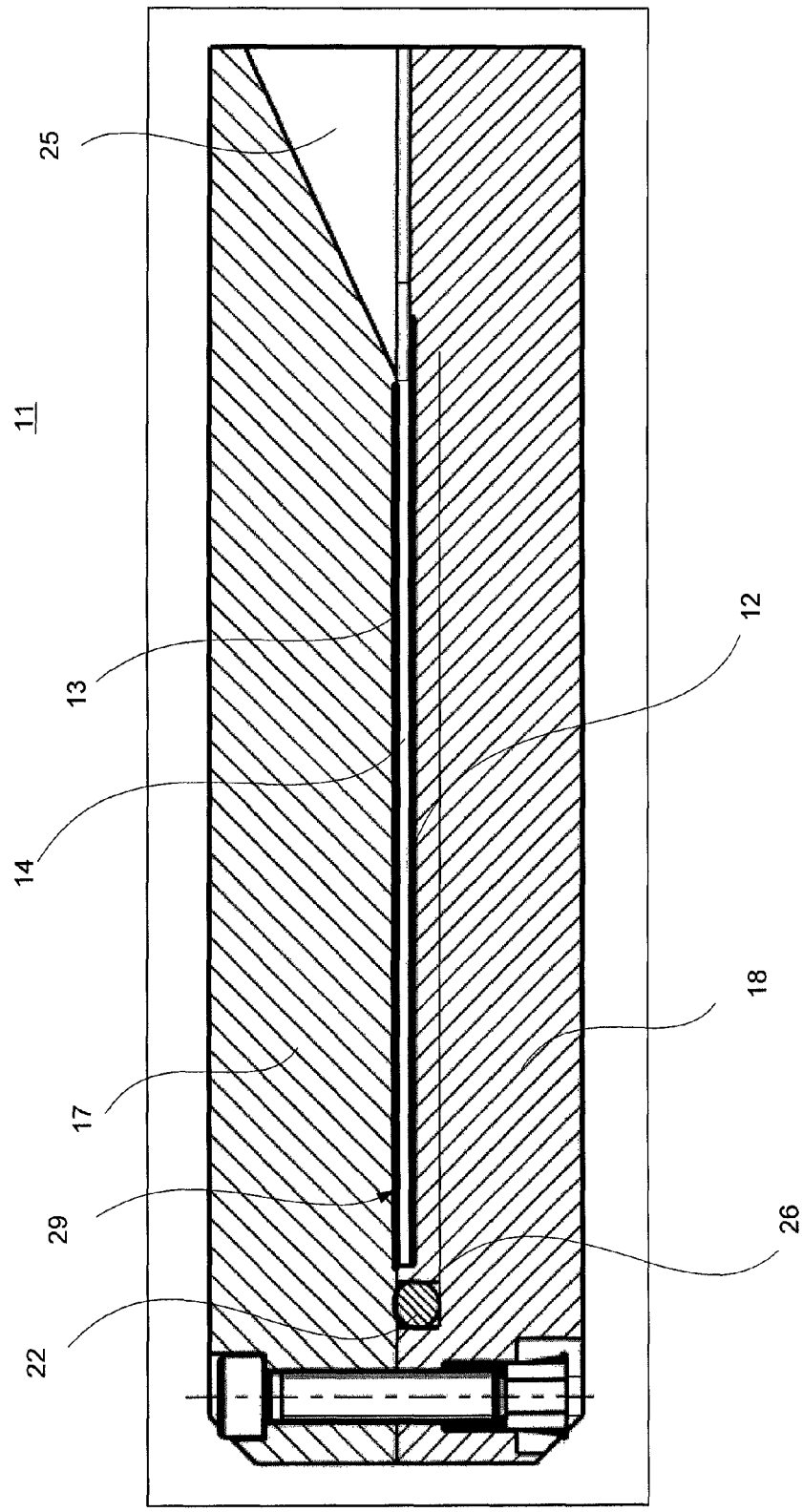

The container 10 which is shown in an enlarged scale again in Fig. 2A comprises, therein, an upper part 16 and a lower part 18. The container 10 comprises additionally a mould cavity 14 as well as a rope seal 22 which is positioned between the upper part 16 and the lower part 18. A micro-structured mould 12 is inserted into a recess of the lower part 18. The upper part 16 and the lower part 18 are held together by screws. The upper part 16 comprises a receiving means 24 for the moulding material.

As can be taken furthermore from FIG. 1, the lower part 18 of the container 10 is spaced from the rotational axes of the centrifuge 20 further away than the upper part 16. Furthermore, the upper region of the micro-structured mould 12 next to the opening of the container is closer to the rotational axes (D) than the area which is positioned in vertical direction below and is arranged next to the bottom of the container.

Figure 4:
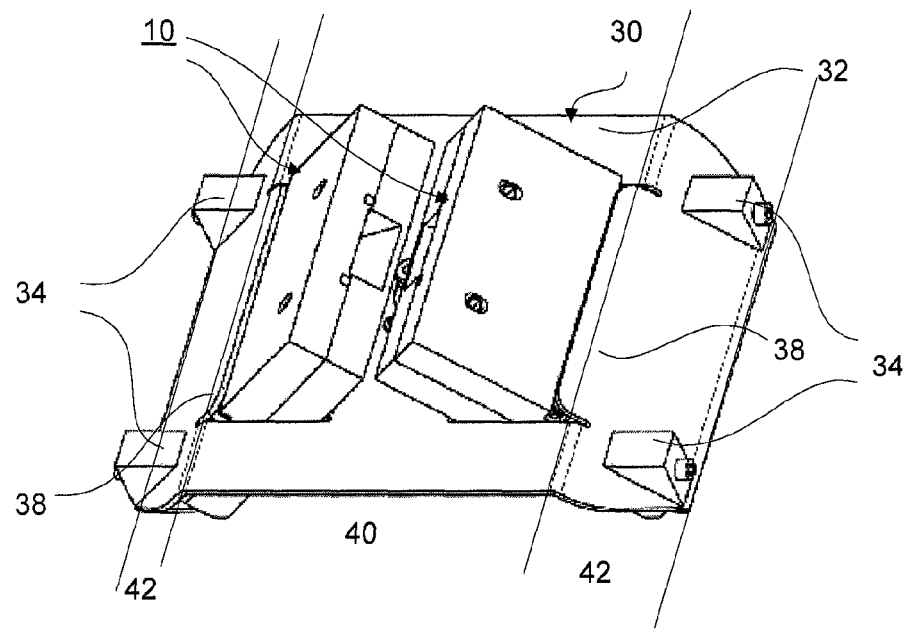
FIG. 4 shows a 3D-view of the container support with containers.

The container support 30 is described in FIG. 4 in more detail. The tension bar 36 is to be highlighted which connects, thereby, two pressure pieces 34. The pressure pieces engage the outer sides of the container supports 38. The tension bar 36 serves for enforcing the carrier plate 32. This construction ensures that the container support 30 does not deform during the centrifugation.

When the centrifuge 20 rotates about its rotational axes, the centrifugal forces ensure that the micro-structured wafer which serves as the mould 12, is pressed against the lower part 18. This allows to do away with an additional mechanical locking means. Furthermore, the PDMS supplied into the material receiving means 24, flows into the mould cavity 14 and is pressed there into the microstructures of the wafer 12 by the centrifugal forces. All of the PDMS is pressed bit by bit into the mould cavity 14. The PDMS is degassed through the density-dependent material separation, and the air is also displaced from all of the mould cavity 14. As a gas-free, completely filled mould cavity 14 is achieved, the PDMS cures. For this purpose, the container 10 is heated to above 80° C. during centrifugation. After curing, the polymer disc having about 1.5 mm thickness and a micro-structured surface can then be taken out.

FIG. 2A shows a section view of a container 10. In this view, one sees particularly well the mould cavity 14 into which the moulding material is input. The micro-structured mould 14 is inserted into the mould receiving means 28 in the lower part 18, wherein the mould receiving means 28 is formed as a recess. A rope seal 22 is pressed into a groove 26 provided for this purpose. It ensures that the moulding material cannot escape from the container 10. The receiving means for the holding material 24 is formed by a recess of the upper part 16. The two parts 16, 17 of the container 10 are connected to each other by screws. The thickness of the layer to be formed depends from the depth of the recess and the height of the micro-structured mould 12. Thereby, the moulding material can flow from the material receiving means 24 into the mould cavity 14. This allows the supply of the moulding material during the centrifugation.

FIG. 2B shows a section view of a modified container 11 in which the upper part 17 with the material receiving means 25 comprises a stamp element 13. The stamp element 13 is received in a stamp receiving means 29 for the stamp element 13. The stamp element 13 is supported such that it is moved in the direction of the lower part 18 by the centrifugal force. This allows the formation of the supplied moulding material. The stamp element 13 has a microstructure at its contact surface to the moulding material. By means of the pressure which the stamp element 13 applies to the moulding material, moulding of microstructures into the moulded body is affected. The receiving means for the stamp element 13 is provided with a releasable locking means (not shown). The locking means ensures that the stamp element 13 does not block the mould cavity if the mould cavity 14 is not yet fully filled with holding material. The locking means maybe released during the centrifugation at a determined point of time.

Figure 3:
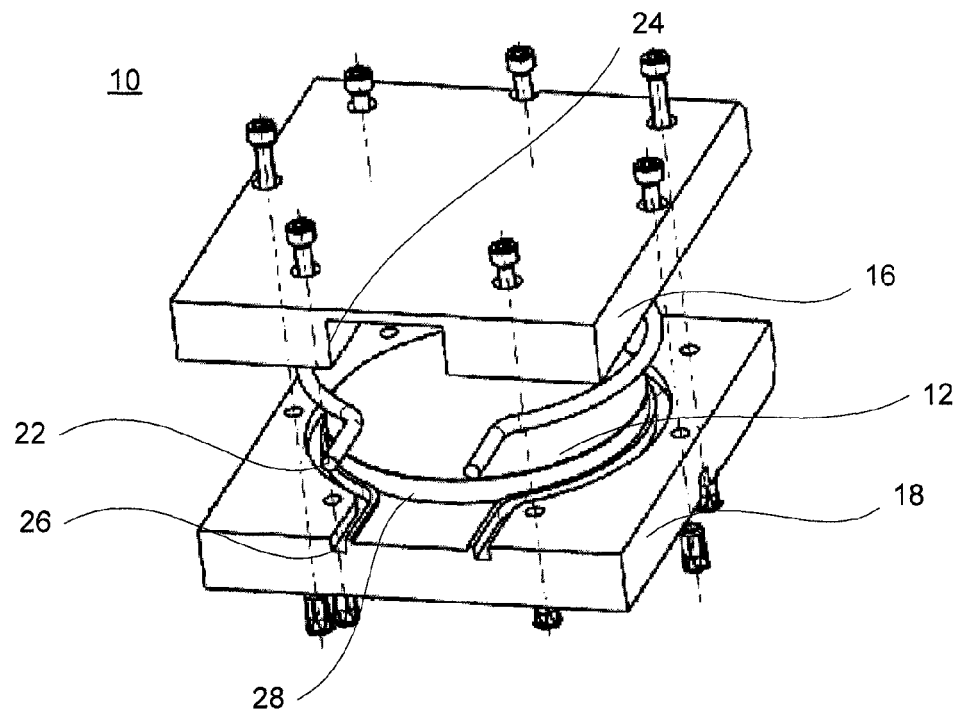
FIG. 3 shows an exploded view of the container.

In FIG. 3, an exploded view of the container 10 is shown. The receiving means of the micro-structured mould 12 is formed by a circular recess. The mould 12 is formed, in this case, as a 4-inch-silicon-wafer. The rope seal 22 surrounds the mould receiving means 28 to a large extent. In analogy to the position of the material receiving means 24, the rope seal 22 forms a seal for the material receiving means at this location. Thereby, the moulding material can get from the receiving means into the mould cavity 14. The mould receiving means 28 is formed as a circular recess of the lower part 18.

As it is furthermore shown in FIG. 3, the two parts of the container 10 are connected to each other by six screws overall. These are inserted through the upper part 16 and are screwed together with the blind rived nuts inserted into the lower part 18. The fixed screws are then countersunk in the upper part 16 as well as in the lower part 18. This connection ensures that there is no relative movement between the upper part 16 and the lower 18, and that the rope seal 22 is efficiently compressed.

The produced disc has a diameter of about 100 mm and consists out of PDMS. The structure may, for example, find application as bio-disc or as part of a chip-laboratory. A micro-structured standard 4-inch-silicon-wafer serves as negative mould.

For removing the structure, the screws are again screwed off. The upper part 16 and the lower part 18 can then be separated, and the disc having the generated microstructure can be released from the wafer.

FIG. 4 shows a container support 30 with two inserted containers 10 in a three-dimensional view. As can be seen in FIG. 3, the container support 30 comprises a central area 40 and, on both ends, a edge area 42 each. The central area 40 is, therein, positioned perpendicularly to the rotational axes. The edge area 42 is, therein, arranged at an angle of 45° to the central area 40. Furthermore, the edge area 42 is formed as a receiving means for a container 10. The container support 30 comprises a support plate 32 from which U-shaped receiving pockets 38 are formed.

Reinforcement structures can be taken from FIG. 4 which comprise pressure pieces 34 as well as tension bars 36. In this view, one mainly sees the paired, opposite pressure pieces 34 which are arranged next to the receiving pockets 38. The tension bars 36 which comprise interior threads at each end, are each connected by screws to the pressure pieces 34. These provide for the stabilisation of the edge area 42. Without this construction, the carrier plate 32 which is formed obliquely at its ends, would bend under the occurring forces because of the comparatively large mass of the container 10.

Figure 5:
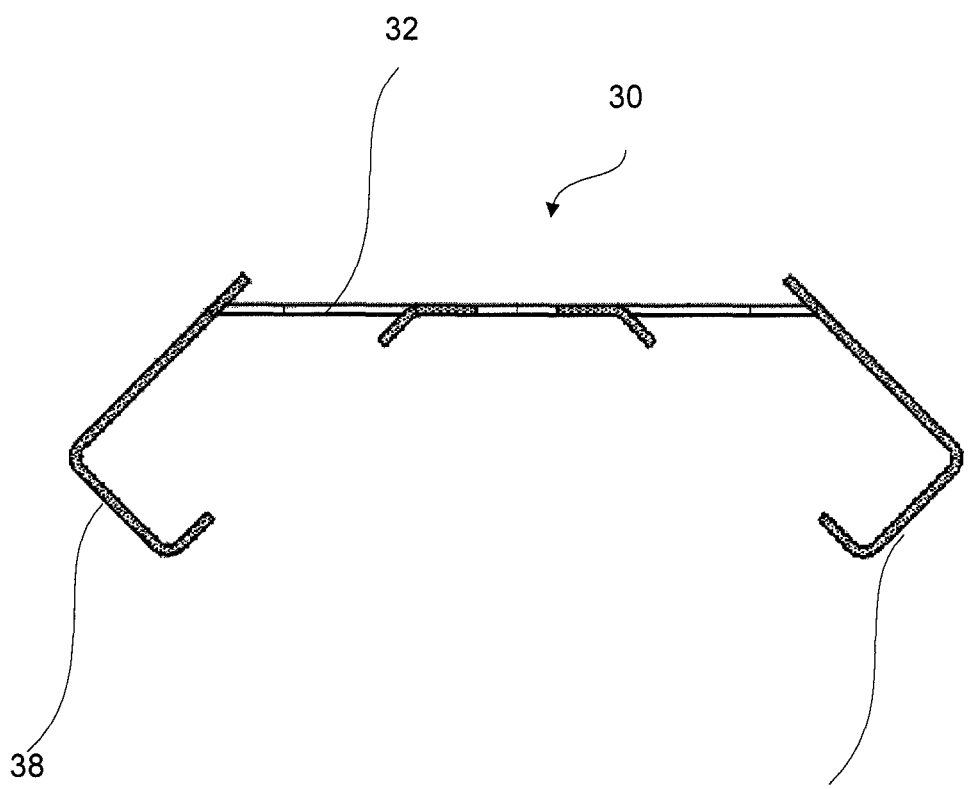
FIG. 5 shows a section view of the support plate.

FIG. 5 shows the carrier plate 32 in section. The U-shaped receiving pockets 38 are particularly well recognisable. One also sees well the oblique orientation of the receiving pockets 38.

The protection of moulded polymer bodies having microstructure by centrifugation is a technically simple, effective and fast possibility of the protection of this structure in high quality.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

LIST OF REFERENCE NUMBERS

- 10 container
- 11 container
- 12 micro-structured mould
- 13 stamp
- 14 mould cavity
- 16 upper part
- 17 upper part
- 18 lower part
- 20 centrifuge
- 22 seal/rope seal
- 24 material receiving means
- 25 material receiving means
- 26 groove for seal
- 28 mould receiving means
- 29 stamp receiving means
- 30 container support
- 32 support plate
- 34 pressure piece
- 36 tension bar
- 38 container receiving means

What is claimed is:

1. Device for producing a moulded body having microstructures made of a moulding material, comprising:
   a container;
   said container comprises an upper part and a lower part connected to each other, said upper and lower parts form said mould cavity for receiving said moulding material;
   a mould, said mould includes a micro-structured surface;
   said lower part of said container includes a mould receiving means and said mould having said micro-structured surface;
   said lower part of said container is located further away from said rotational axis of said centrifuge than said upper part of said container;
   said upper part of said container comprises a stamp element and a receiving means for said stamp element;
   said stamp element comprises a micro-structured surface;
   said mould having said micro-structured surface being spaced apart from said stamp element;
   said moulding material resides between said microstructured surface of said stamp element and said microstructured surface of said mould;
   said container mounted to a rotatable centrifuge and said container is rotatable about a rotational axis;
   said stamp element is movable in the direction of said mould of said lower part of said container by means of centrifugal force when said container is rotated producing a moulded body having a first surface formed by said micro-structured surface of said stamp element and a second surface formed by said micro-structured surface of said mould, and, said first and second surfaces of said moulded body are spaced apart from each other.

2. Device according to claim 1, wherein said mould is heated.

3. Device according to claim 1, wherein said container is heated.

4. Device according to claim 1, wherein said container is a UV-permeable, material.

5. Device according to claim 4, further comprising a UV-radiator.

6. Device according to claim 1, wherein said centrifuge includes a rotor and said container is connected to said rotor of said centrifuge through a container support.

7. Device according to claim 1, wherein said container support includes a container receiving means for embracing and supporting said container.

8. Device according to claim 7, wherein said container receiving means is mounted obliquely with respect to said rotational axis.

* * * * *